United States Patent [19]

Cheriton et al.

[11] 4,394,175

[45] Jul. 19, 1983

[54] SELF-LEVELLING CEMENTITIOUS MIXES

[76] Inventors: Leslie W. Cheriton, 3 Meadow Way, Wing, Leighton Buzzard, Bedfordshire, LU7 0TG; Philip J. Ansell, 20 Grove Way, Simpson, Milton Keynes, Buckinghamshire, both of England

[21] Appl. No.: 261,325

[22] Filed: May 7, 1981

[51] Int. Cl.³ ............................................. C04B 7/35
[52] U.S. Cl. ...................................... 106/90; 106/18; 106/104
[58] Field of Search ........................... 106/90, 98, 104

[56] References Cited

U.S. PATENT DOCUMENTS 3,600,203  8/1971  Aldera ............................. 106/104
4,157,263  6/1979  Gaines et al. ..................... 106/104

Primary Examiner—James Poer
Attorney, Agent, or Firm—Caesar, Rivise, Bernstein & Cohen, Ltd.

[57] ABSTRACT

A self-levelling cementitious mix, especially a screeding mix comprises high alumina cement and portland cement in non-critical proportions together with sufficient plasticizer and set retarder to make the mix workable in an acceptable setting period. Preferable proportions of the cement are 20–80:80–20 most advantageously 50:50.

14 Claims, No Drawings

SELF-LEVELLING CEMENTITIOUS MIXES

This invention relates to self-levelling cementitious mixes for floors, especially concrete floors.

It is known to cover floors with various types of tiling or sheet floor coverings (e.g. linoleum, wood blocks, carpeting, polyvinyl chloride and rubber sheets). For the covering to have a useful life it is necessary that the floor to be covered is flat. In the case of concrete and similar cast floors it is generally necessary to apply a screeding mix to level the surface.

Self-levelling mixes based on hydraulic cement binders, i.e., mixes which will flow and thus take up a true horizontal surface level prior to setting, are known. The principal components of such mixes are sand and cements (to give hardening) and casein (which gives the self-levelling properties). These mixes are disadvantageous to use as there may be a tendency for bacterial and other micro-organism infestation of the mixes, due to the casein present. Self-levelling properties may be obtained without the use of casein (or similar proteinous material) by the use of mixtures containing lignosulphonate (for example from sulphite lye) and a metal salt of an oxyacid of sulphur, excluding sulphates, see U.S. Pat. No. 1,313,763.

The cement component of a self-levelling mix is usually a mixture of portland cement and high alumina cement, respectively called herein PC and HAC. It has been customary to use a major proportion of PC, firstly for economy and secondly because otherwise the set of the mix is too fast to be workable. It has been considered necessary to keep the content of HAC below 20% by weight. The content of HAC is critical and it will vary dependent on the activity of the HAC. This is a drawback since it makes manufacture of a consistent product difficult.

It is an object of this invention to provide a mix, preferably in dry powder form, for a self-levelling screed or coating in which the content of HAC is not so critical.

According to the invention, a self-levelling cementitious mix comprises sand and other fillers, a hydraulic cement component of PC and HAC in a weight ratio of 20–80:80–20, sufficient of a plasticiser component in sufficient quantity to make the mix workable and sufficient of a set retarder component to delay the initial setting time.

A mix of the invention is easy to manufacture because the proportions of the cements can be varied relatively widely, without adverse effect on the setting times. Preferably the proportions are 30–70:70–30, most preferably 50:50. The portland cement can be ordinary Portland cement, rapid hardening cement or the like.

The plasticiser is preferably based on polymerised resins such as a superplasticiser, e.g. melamine formaldehyde sulphonic acid condensate. Typically the chain length in the polymer may range from about 6 as in a naphthalene sulphonate to about 70 as in the superplasticiser just named. The concentration of the plasticiser should be as low as possible, generally about 1% by weight of the hydraulic cement component and about 0.4% by weight of the total powder composition.

The set retarder component may be provided by one or more of organic hydroxycarboxylic acids, organic acids or polyacids and salts or inorganic soluble salts of metals, e.g. magnesium, aluminium, manganese, nickel, copper, zinc, tin or lead. The concentration of the retarder component may be adjusted to make the mix have an initial set time of about one hour, and different concentrations will usually be required according to the ambient temperature.

The sand may be any convenient type, and, if desired, inert fillers may be included, e.g. alumina, chromite flour. The presence of fine grade fillers, i.e. having an average particle size of about 3 to about 4 micron, is a preferred feature of the invention since this tends to increase the compressive strength of the set compositions. It is also preferred to include a whiting in the compositions as an aid to self-levelling properties. One or more of the fillers may be chosen to react chemically with the high alumina cement. An advantage of such a mix of the invention is that there is little tendency for cracks to form in the set coating because the mix is rapid hardening and has tendency to self compensate for shrinkage.

Preferably the mix includes a lignosulphonate and a metal salt of an oxyacid of sulphur. Preferred are sulphates, sulphites, bisulphites and metabisulphites, though others such as thiosulphites, thionates and thiosulphates may also be used. The metal salts are preferably sodium or calcium salts. The most preferred salts are calcium and sodium sulphites. The lignosulphonate is preferably a sodium or calcium lignosulphonate, and is conveniently present as sulphite lye. A sugar reduced sulphite lye is a preferred material for inclusion in the mix.

The mix preferably includes a minor proportion of a powdered vinyl polymer, for example polyvinyl acetate or a copolymer of vinyl acetate with some other monomer. The inclusion of such a polymeric material enhances the binding and resilient properties of the mix.

The self-levelling mixes of the invention are best suited for laying at an average thickness of 1.5 mm, i.e. from a maximum depth of 3 mm to nothing but they can be used to a depth or variation in depth of up to 15 mm. If the floor to be screeded is more than 3 mm out of level, the mix may be diluted with sand and used at greater thicknesses.

In use, the mix is mixed with water to a smooth pasty consistency, and then more water is added to produce a highly fluid material. This is then applied to the floor to an approximately even thickness. The water:cement ratio is preferably 0.3 to 1:1.

If desired, the floor may be primed before screeding in order to secure better adhesion of the screed thereto. One suitable primer for concrete floor is a latex composition based on polyvinyl acetate homopolymer or copolymer; another is a styrene butadiene rubber. The mix may be adapted for use at from about 5° C. to about 45° C.

The invention includes a method of making a self-levelling mix, a method of applying the mix to a substrate and a floor which has been screeded with the mix.

The invention may be illustrated by the following examples in which all parts are by weight:

EXAMPLE I

A composition was made by mixing together the following:

| Cement | PC | 50 |
|---|---|---|
| | HAC | 50 |
| | | 100 |

Other ingredients, parts by weight relative to the 100 parts of the cement, were as follows and these were blended with the cement:

| Sand and fine grade fillers | 217 |
| --- | --- |
| Vinyl polymer | 8.3 |
| Calcium lignosulphonate | 1.20 |
| Retarder | 1.15 |
| Superplasticiser | 1.33 |
| Cellulose ether | 1.08 |
| Defoamer | 0.335 |
| Hardener | 0.05 |

The powder was mixed with water in a water:powder ratio of 0.24:1 to form a smooth free-flowing and self-levelling fairing material which was used to level out a concrete floor slab. The initial set of the mix was about one hour at 30° C. The compressive strength measured one day later was 10 Newtons/sq. mm. and after seven days it was 5 Newtons/sq. mm. A covering was applied to the levelled substrate.

EXAMPLE II

A composition was made by mixing together the following:

| Cement | PC | 50 |
| --- | --- | --- |
|  | HAC | 50 |
|  |  | 100. |

Other ingredients, parts by weight relative to the 100 parts of cements were added as follows:

| Sand and fine grade fillers | 217 |
| --- | --- |
| Vinyl polymer | 8.3 |
| Calcium lignosulphonate | 1.20 |
| Retarders | 0.6 |
| Superplasticiser | 1.33 |
| Cellulose ether | 1.08 |
| Defoamer | 0.335 |
| Hardener | 0.15 |

The ingredients were mixed to form a dry powder. The powder was mixed with water in water:powder ratio of 0.24:1 to form a smooth free-flowing and self-levelling fairing material which was used to level out a concrete floor slab prior to covering. The initial set of the mix was about one hour at 20° C. The compressive strength measured 24 hours later was 15 Newtons/sq. mm. and measured seven days later it was 20 Newtons/sq. mm.

EXAMPLE III

A series of mixtures was made up as follows:

|  | MIX | A | B | C |
| --- | --- | --- | --- | --- |
| Rapid Hardening | PC | 25 | 50 | 75 |
|  | HAC | 75 | 50 | 25 |
|  | Total | 100 | 100 | 100 | to each mix was added

| Sand and light weight fillers | 177 |
| --- | --- |
| Vinyl polymer | 1.6 |
| Superplasticiser | 1.3 |
| Retarders | 1.1 |
| Cellulose ether | 0.01 |
| Hardener | 0.16 |

| -continued | |
| --- | --- |
| Defoamer | 0.36 |

Each mix was blended with water in a water:powder ratio of 0.24:1. The initial flow of the wetted mixture was measured by a cone flow method. The mixes were allowed to set and then the compressive strengths were measured after one day and three days. The following results were obtained:

| MIX | A | B | C |
| --- | --- | --- | --- |
| Final set (mins) | 270 | 115 | 300 |
| 1 day compressive strength (N/mm$^2$) | 8 | 16 | 2 |
| 3 day compressive strength (N/mm$^2$) | 11 | 19 | 3 |

In each case the formed surface was level, smooth and free of cracks even after prolonged storage at 20° C. and 65% relative humidity.

In the case of mixes A and C the retardation was unduly prolonged, however, by adjusting the proportion of the retarder the setting rate can be adjusted.

These results show that the proportion of PC:HAC may be varied and the proportion of the other ingredients may be adjusted to provide a satisfactory self-levelling cementitious mix.

Without further elaboration the foregoing will so fully illustrate our invention that others may, by applying current or future knowledge, readily adapt the same for use under various conditions of service.

What is claimed as the invention is:

1. A self-levelling screeding composition in the form of a free flowing paste, said composition comprising sand and other fillers, water, and hydraulic cement component comprising a portland cement and a high alumina cement characterized in that the cements are present in a weight ratio of 20–80:80–20 and in that the composition further includes a plasticiser component in a weight ratio of about 1% of the cement component to make the mix workable and sufficient of a set retarder component to delay the initial setting time about one hour.

2. A composition according to claim 1, characterized in that the proportions of the cement are 30–70:70–30.

3. A composition according to claim 2, characterized in that the cements are present in equal quantities.

4. A composition according to claim 1, characterized in that the plasticiser is polymerised resin.

5. A composition according to claim 4, characterized in that the chain length of the polymer may range from 6 to 70.

6. A composition according to claim 4, characterized in that the plasticiser is melamine formaldehyde sulphonic acid condensate.

7. A composition according to claim 1, characterized in that the concentration of the plasticiser is 1% by weight of the hydraulic cement component and about 1.4% by weight of the total powder composition.

8. A composition according to claim 1, characterized in that the set retarder component is one or more of organic hydroxycarboxylic acids, organic acids or polyacids and salts or inorganic soluble salts of alkali metals.

9. A composition according to claim 8, characterized in that the concentration of the retarder component is adjusted to make the mix have an initial set time of about one hour.

10. A composition according to claim 1, characterized by the presence of a minor proportion of a powdered vinyl polymer.

11. A composition according to claim 1, characterized by the presence of fine grade fillers.

12. A composition according to claim 1, characterized by the presence of fillers which chemically react with the high alumina cement.

13. A method of levelling the surface of a floor, comprising applying to the floor a paste of water and self levelling cementitious composition, the composition comprising:
   sand and like fillers,
   a hydraulic cement component comprising a portland cement and a high alumina cement, the cements being present in a weight ratio of 20-80:-80-20,
   a plasticiser component in a weight ratio of about 1% of the cement,
   a set retarder component in a proportion to make the initial set time of the composition be about one hour, the water being added in a proportion to form a free flowing paste, the paste being applied to a maximum thickness of about 3 mm and an average thickness of about 1.5 mm, and allowing the paste to set.

14. A method according to claim 13, characterized in that the composition is allowed to set to an average thickness of 1.5 mm.

* * * * *